United States Patent [19]

Ayukawa

[11] Patent Number: 4,466,028
[45] Date of Patent: Aug. 14, 1984

[54] DEVICE FOR REVERSING A RECORDING MEDIUM FOR USE WITH A RECORDING AND REPRODUCING APPARATUS

[75] Inventor: Yukitada Ayukawa, Saitama, Japan

[73] Assignee: Pioneer Electronic Corporation, Tokyo, Japan

[21] Appl. No.: 345,904

[22] Filed: Feb. 4, 1982

[30] Foreign Application Priority Data

| Feb. 14, 1981 | [JP] | Japan | 56-20291 |
| Feb. 14, 1981 | [JP] | Japan | 56-20292 |
| Feb. 14, 1981 | [JP] | Japan | 56-20293 |
| Feb. 14, 1981 | [JP] | Japan | 56-20294 |
| Feb. 14, 1981 | [JP] | Japan | 56-20295 |
| Feb. 14, 1981 | [JP] | Japan | 56-20296 |
| Feb. 14, 1981 | [JP] | Japan | 56-20297 |
| Feb. 14, 1981 | [JP] | Japan | 56-20298 |
| Feb. 14, 1981 | [JP] | Japan | 56-20299 |
| Feb. 14, 1981 | [JP] | Japan | 56-20300 |
| Feb. 14, 1981 | [JP] | Japan | 56-20301 |

[51] Int. Cl.³ .................. G11B 15/00; G11B 17/00; G11B 19/00
[52] U.S. Cl. ........................ 360/71; 369/200
[58] Field of Search ............ 360/71, 96.5, 96.6, 360/74.1; 369/200

[56] References Cited

U.S. PATENT DOCUMENTS

| 3,833,224 | 9/1974 | Haake | 360/92 |
| 3,996,616 | 12/1976 | Sturrock et al. | 360/92 |
| 4,196,907 | 4/1980 | Takizawa et al. | 274/10 C |
| 4,394,698 | 7/1983 | Schatteman | 360/96.5 |

FOREIGN PATENT DOCUMENTS 56-169253 12/1981 Japan ...................... 360/71

Primary Examiner—George G. Stellar
Attorney, Agent, or Firm—Sughrue, Mion, Zinn, Macpeak and Seas

[57] ABSTRACT

A device for reversing a recording medium such as a cassette tape or a record disc for use with a recording and reproducing apparatus which is equipped with an automatic cassette ejection mechanism is disclosed. The device includes a gripper which is adapted to grip the cassette in an ejected position is shiftable between the cassette gripping position and a reversing position in which the cassette is rotated by a reserver substantially through 180 degrees so as to be turned over while the latter is gripped by the gripper. After the cassette is reversed and the gripper returns to the gripping position, the cassette is released from the gripper by a releasing device.

21 Claims, 11 Drawing Figures

DEVICE FOR REVERSING A RECORDING MEDIUM FOR USE WITH A RECORDING AND REPRODUCING APPARATUS

BACKGROUND OF THE INVENTION

The present invention relates to a device for reversing a recording medium for use with a recording and reproducing apparatus.

In recording and reproducing devices such as cassette tape recorders and record disc players, it is necessary to reverse or turn over a cassette tape or record disc after one side thereof is used to record or reproduce. This procedure is known as "reversing."

To effect such reversing, conventional recording and reproducing apparatus such as tape recorder has a driving device which can move the tape etc. in either of opposite directions at a constant speed and the moving direction is switched at suitable times as desired or upon detection of a tape end. In such apparatus as having a reciprocating reversing mechanism, the driving device must comprise two drivers for moving a tape in a first direction and in an opposite direction within a limited space which causes a structure thereof to be complex resulting in high manufacturing cost, low reliability. In order to resolve the problem inherent to the conventional reversing means of the type mentioned, there has been proposed a tape reversing device for use with one driver for moving the tape in one direction.

In such tape reversing device, a cassette is brought from a tape using position to a reversing position in which the cassette can be turned around, so that the cassette can be reversed. The tape recorder with such a reversing device is essentially better than the tape recorder having two drivers in performance and reliability. However, since the mechanism for lifting and reversing the cassette is located in confronting relation to the tape driving device, the mechanism cannot easily be repaired or serviced. Furthermore, the cassette reversing mechanism disposal in a position and space confronting the tape driving means prevents the user from monitoring the cassette and the tape therein while the tape is running.

The foregoing defects are equally true for the recording and reproducing apparatus in the form of record player or digital audio disc player. Particularly, in the latter player in which a disc is inserted through a slot in a front, side or upper face of the apparatus, it is necessary to eject the disc out of the apparatus, after one face of the disc has been used to turn over the disc and then to insert the disc into the apparatus through the slot etc. manually. To avoid such manual operations, a device having a mechanical means for automatically turning over the disc as ejected by a disc holder is required.

SUMMARY OF THE INVENTION

It is an object of the present invention to provide a device for automatically reversing a recording medium for use in a recording and reproducing apparatus, which device is simple in construction, can be serviced with ease, and allows the recording medium to be monitored unobstructedly from the exterior during a recording or reproducing more of operation of the apparatus.

DETAILED DESCRIPTION OF PREFERRED EMBODIMENT

A preferred embodiment of the present invention will be described in detail with reference to the drawings.

Figure 1:
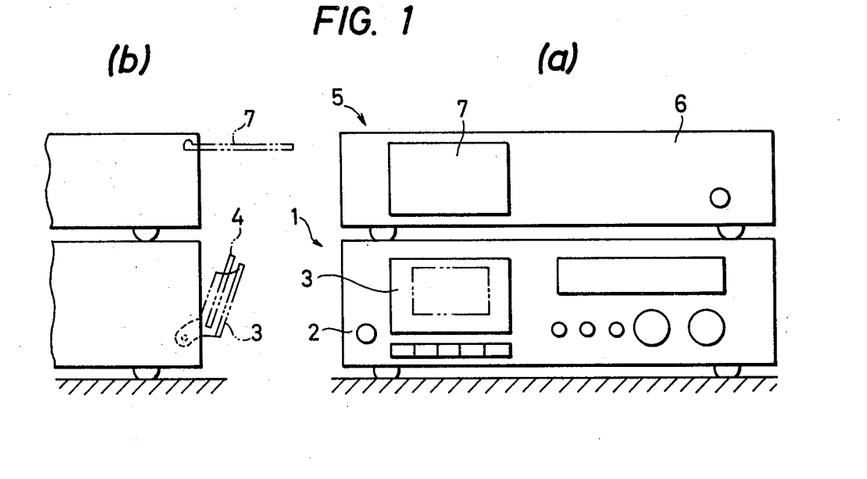
FIG. 1 shows an embodiment of a device for reversing a recording medium according to the present invention, the device being placed on a recording and reproducing apparatus, in which FIG. 1(a) being a front elevational view of the device and FIG. 1(b) a fragmentary side elevational view thereof.
Figure 2:
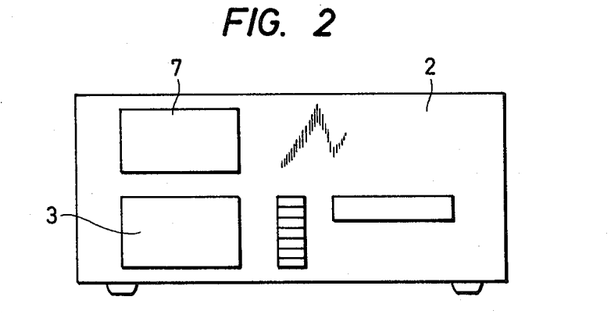
FIG. 2 is a front elevational view showing an appearance of another embodiment of the present invention.

FIG. 1(a) is a front view of a device 5 for reversing a recording medium according to the present invention, the device 5 being mounted on a recording and reproducing apparatus and FIG. 1(b) is a fragmentary side elevational view thereof. In the illustrated embodiment, a recording and reproducing apparatus comprises a cassette deck 1, and a recording medium, here, a cassette tape 4. The cassette deck 1 has a one-direction constant speed tape driving function and includes a front panel 2 on which there is mounted a cassette holder 3 to which the tape cassette 4 is inserted from the above. The cassette reversing device 5 according to the present invention is adapted for use on the cassette deck 1 as shown in FIG. 1. The cassette reversing device 5 and the cassette deck 1 serve, in combination, as a unit. The device 5 has a front panel 6 and a door 7 for an opening of the panel 6 to prevent entry of dust into the device 5 and allow the device 5 to be serviced with ease therethrough. The cassette deck 1 and the cassette reversing device 5 may be incorporated in a unitary construction as illustrated in FIG. 2.

Figure 3:
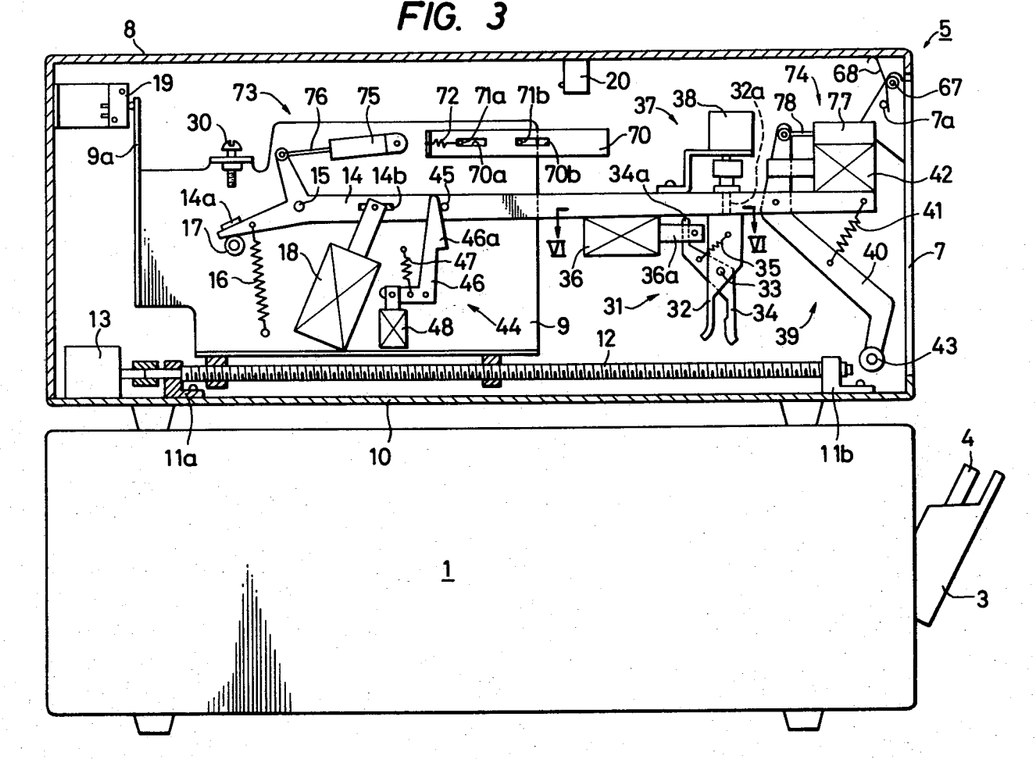
FIG. 3 is a partially cross-sectional side elevational view of the reversing device in FIGS. 1 and 2 showing a first position of a driver.

FIG. 3 is a partially cross-sectional side elevational view of the cassette reversing device 5. The device 5 comprises a unit housing 8, the front panel 6 being a portion thereof, in which there is mounted a subchassis 9 held in thread engagement with a lead screw 12 rotatably supported by bearing 11a, 11b on a bottom plate 10 of the housing 8 and coupled with a reversible motor 13 so that, upon an energization of the motor 13, the subchassis 9 moves along the lead screw 12 in either forward or reverse direction (i.e. right or left in FIG. 3) depending upon the rotational direction of the motor as shown in FIG. 3. The subchassis 9 supports thereon a driver 14 in the form of lever. The driver 14 is vertically rotatably attached thereto by a pin 15 and biased counterclockwisely by a biasing spring 16 connected between a rear end 14a of the driver 14 and the subchassis 9. The driver 14 is prevented from an excess counterclockwise movement by a stopper pin 17 secured to the subchassis 9. The clockwise movement of the driver 14 is provided by a plunger 18 having a top end received in a slot 14b formed in the driver 14.

Figure 4:
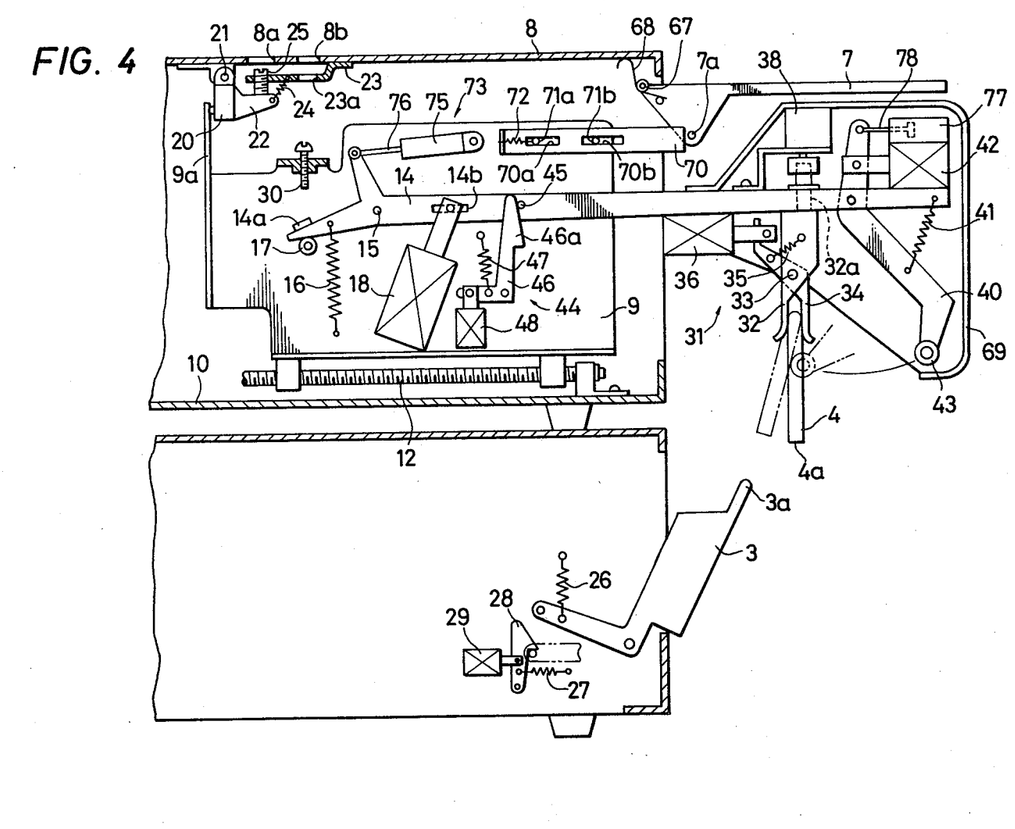
FIGS. 4 and 5 are partial side elevational views of the device in FIG. 3 showing a second and third positions of the driver, respectively.

The driver 14 is movable between a first position in which the driver 14 is kept within the housing 8, as shown in FIG. 3, a second position in which the driver 14 partly projects out of the housing 8, as shown in FIG. 4, upon a forward movement of the subchassis 9 along the lead screw 12. The first position of the driver 14 is detected by a switch 19 attached to a rear wall of the housing 8. That is, when the driver 14 is in the first position, a portion 9a of the subchassis 9 contacts with the limit switch 19 causing it to supply a signal. The driver 14 in the second position is detected by a contact of a limit switch 20 secured to an upper wall of the housing 8 with the portion 9a of the subchassis 9. (FIG. 4) The limit switch 20 produces an output when contacted with the subchassis, de-energizes the motor 13 to stop the rotation of the lead screw 12 and hence the subchassis 9, whereupon the driver 14 is retained in the second position. As shown in detail in FIG. 4, the limit switch 20 is fixedly secured to a support 2 swingably connected through a pin 22 to the upper wall of the housing 8. The swingable support 22 is biased to turn counterclockwise by a biasing spring 24 connected between an end of the support 22 and an auxiliary chassis 23 secured to the upper wall of the housing 8. The counterclockwise swing of the support 22 is limited by an adjustment screw 25 threaded through the auxiliary chassis 23. The position in which the limit switch 20 can be actuated, i.e. the second position for the driver 14 can be adjusted by turning the adjustment screw 25 with a screwdriver or the like through a hole 8a in the upper wall of the housing 8 to adjust the angular position of the support 22.

When a recording or reproducing mode of operation of the cassette deck 1 is finished, a known tape end detector (not shown) incorporated therein generates a control signal to stop the operation of the cassette deck. At the same time, the cassette 4 is ejected in response to the control signal.

As illustrated in FIG. 4, the cassette holder 3 with the cassette 4 held therein is rotatable and biased by a spring 26 clockwisely. The cassette holder 3 is normally engaged, as shown by an imaginary line, with a hook 28 rotatably mounted on a cassette deck body and biased by a spring 27 clockwisely. The hook 28 is coupled with a plunger 29 which is energizable in response to a control signal from the tape end detector to rotate the hook 28 counterclockwisely, so that the hook is disengaged from the cassette holder 3 to allow the latter to rotate clockwisely to an eject position for the cassette 4.

The motor 13 is also responsive to such a control signal to start driving the lead screw 12 and hence the subchassis 9 for moving the driver 14 from the first to the second position until the motor 13 is de-energized by the output signal from the limit switch 20.

When the driver 14 reaches the second position, the plunger 18 is actuated in response to a signal generated by a control circuit (described later on), thus turning the driver 14 clockwisely against the spring 16 until the rear end 14a is brought into contact with an adjustment screw 30 threadedly mounted on the subchassis 9 to start operation for reversing the cassette 4. The driver 14, when the rear end 14a contacts with the adjustment screw 30 takes a third position which is adjustable by turning the adjustment screw 30 with a screwdriver or the like inserted through holes 8b, 23a respectively in the housing 8 and the auxiliary chassis 23. The driver 14 in the third position is shown in FIG. 5.

The driver 14 has on its free end a gripper 31 for gripping the cassette 4 as it is ejected by the cassette holder 3. The gripper 31 comprises a first grip arm 32 which is rotatably mounted by a vertical rotary shaft 32a on the driver 14, a second grip arm 34 pivotably mounted by a pin 33 on the first grip arm 32, and a spring 35 urging the second grip arm 34 in a direction to move a distal end thereof toward a distal end of the first grip arm 32. A plunger or a releasing device 36 is mounted on the driver 14 and engageable with a rear end 34a of the second grip arm 34 against the spring 35 to cause grip arms 32, 34 to release the cassette 4 when actuated.

Figure 5:
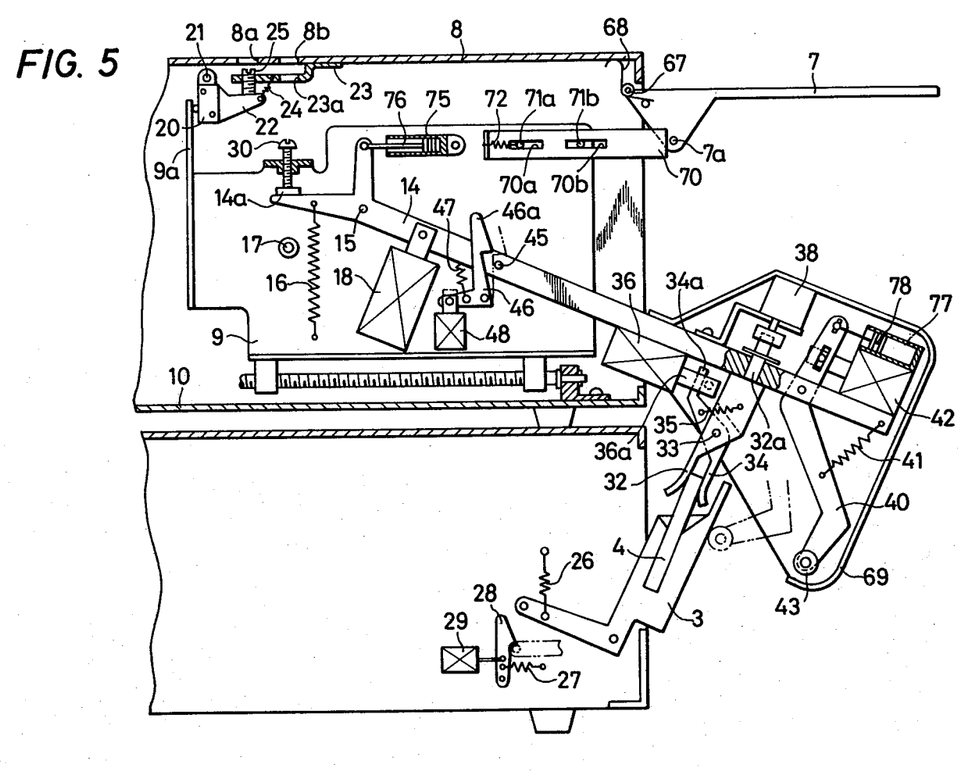

In FIG. 5, the driver 14 is shown as being in the third position, that is, the gripper 31 is shown as being in a position to grip the cassette 4. In this position, the first and second grip arms 32, 34, under the force of the spring 35, grip the cassette 4 in the holder 3 protruded outside of the deck 1 upon the control signal. The grip arms 32, 34 have on their far ends, slanted surfaces to smoothen the gripping of the cassette 4.

After the gripper 31 has gripped the cassette 4, the plunger 18 is de-energized at a suitable time, whereupon the driver 14 is caused to return to the second position, i.e., the position to reverse the cassette 4 by the spring 16 as illustrated in FIG. 4.

Figure 6:
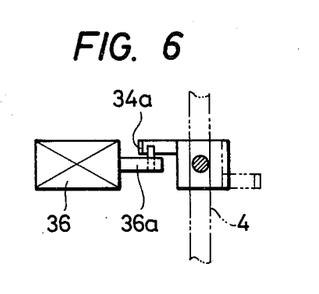
FIG. 6 is a plan view of a gripper means of the device shown in FIG. 3.

The gripper 31 is directly coupled to a reverser 37 for reversing the cassette 4. In FIG. 3, the reverser 37 comprises a rotary plunger 38 coupled to the pivot shaft 32a of the first grip arm 32. The plunger 38, when actuated, rotates the shaft 32a and hence the gripper 31 through approximately 180 degrees with respect to the driver 14 in a horizontal plane so that the cassette 4 gripped by the gripper 31 is reversed which is a plan view taken along a line VI—VI in FIG. 3.

After the cassette 4 has been turned around in the horizontal plane, the plunger 18 is energized again to cause the driver 14 to swing clockwisely in the vertical plane for inserting the cassette 4 carried by the gripper 31 into the cassette holder 3. At this time, a free end of the cassette 4 is rotated along a locus outside of a far end 3a of the cassette holder 3. To cope with this, there is provided an actuator 39 (FIG. 3) for displacing the free end 4a of the cassette 4 so that the end will be positioned inside of the distal end 3a of the cassette holder 3.

The actuator 39 comprises a swing arm 40 vertically rotatably mounted on the driver 14, a spring 41 biasing the arm 40 counterclockwisely and a plunger 42 for rotating the swing arm 40 clockwisely against the bias of the spring 41. As the driver 14 commences to vertically swing in a direction to insert the cassette 4 into the cassette holder 3, the plunger 42 is actuated to turn the swing arm 40 clockwisely to cause a roller 43 mounted on far end of the swing arm 40 to push and displace the cassette 4 and hence its free end 14a as shown by imaginary lines in FIG. 4. The cassette 4 can now be inserted reliably into the cassette holder 3. When the cassette 4 is fully inserted into the cassette holder 3, the releasing plunger 36 is energized to actuate the second grip arm 34 so that the cassette 4 will be released from the first and second grip arms 32, 34.

The actuator 39 serves not only to displace the free end 4a of the cassette 4 during the insertion of the latter into the cassette holder 3, but also to bring the cassette holder 3 to a loading position in which recording or reproducing operation can be effected. That is, the cassette 4 inserted into the holder 3 can be loaded into the cassette deck 1 by causing the plunger 42 to turn the swing arm 40 clockwisely and hence push the cassette holder 3 into the deck 1 with the roller 43 while the driver 14 is in a fourth position during its return from the third to the second position. The positional relationship between the swing arm 40 and the cassette holder 3 can be adjusted by the adjustment screw 30. The roller 43 mounted on the far end of the swing arm 40 is made of rubber or resin, or preferably of a material such as Teflon whose friction coefficient is small, to prevent the outer faces of the cassette 4 and the cassette holder 3 from being damaged upon contact with the roller 43.

The fourth position for the driver 14 is determined between the second and third positions by a positioning device 44 (FIG. 4) which comprises an engagement arm 46 vertically rotatably mounted on the subchassis 9 and having a hook 46a engageable with a pin 45 fixed to the driver 14, a spring 47 biasing the arm 46 clockwisely, and a plunger 48 for driving the engagement arm 46 to turn counterclockwisely against the resiliency of the spring 47. The engagement arm 46 is normally prevented from rotate clockwisely by the plunger 48 which is normally energized. When the driver 14 returns from the third position after the cassette 4 has been inserted in the cassette holder 3, the plunger 48 is de-energized to allow the spring 47 to move the hook 46a into a position in which the hook 46a is engageable with the pin 45 on the driver 14. On the returning movement of the driver 14 from the third to second position, the pin 45 engages with the hook 46a of the engagement arm 46, whereupon the driver 14 is held in the fourth position. In the fourth position, the actuator 39 loads the holder 3 into the position for recording or reproducing operation, and thereafter the plunger 48 is energized once again in response to a signal generated by the control circuit to be described, thereby releasing the pin 45 from the hook 46a of the engagement arm 46. The driver 14 is now allowed to move back from the fourth to the second position. The positioning device 44 may be of other construction. For example, the driver 14 may be retained in the fourth position by a cam mechanism.

Figure 7:
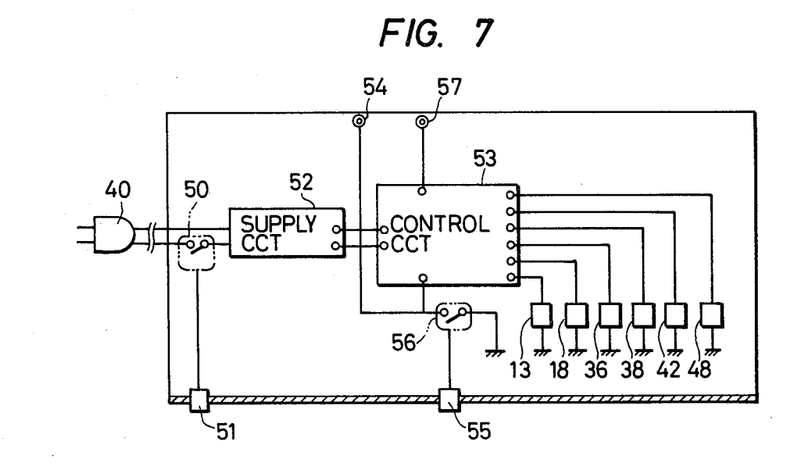
FIG. 7 is a block diagram of an example of a control system for the device of the present invention.

Operations of the foregoing various devices are effected in a sequence with predetermined timing. A basic circuit for controlling the operations of the devices should be designed so as to satisfy various conditions. An example of the circuit is shown in FIG. 7 in which the present cassette reversing device 5 has a power supply switch 50 connected to an AC plug 49. The power supply switch 50 is interlinked with a power supply switch 51 mounted on the panel 6. AC power is supplied via the switch 50 to a power supply circuit 52 in which it is converted into a constant DC voltage. A control circuit 53 comprises a logic circuit supplied with the constant DC voltage for starting a sequence of operations in response to a control signal supplied from a terminal 54 upon detection of the tape end in the cassette deck 1. A manual switch 56 is provided to make the circuit operable arbitrarily independently from the control signal. The switch 56 is operated manually by pushing a button 55 mounted on the panel 6 to start a sequence of operations. Designated at 57 is a terminal for supplying the cassette deck 1 with an output from the control circuit 53 to bring the cassette deck 1 into either of the recording or reproducing operation after a series of operations has been completed.

Figure 8:
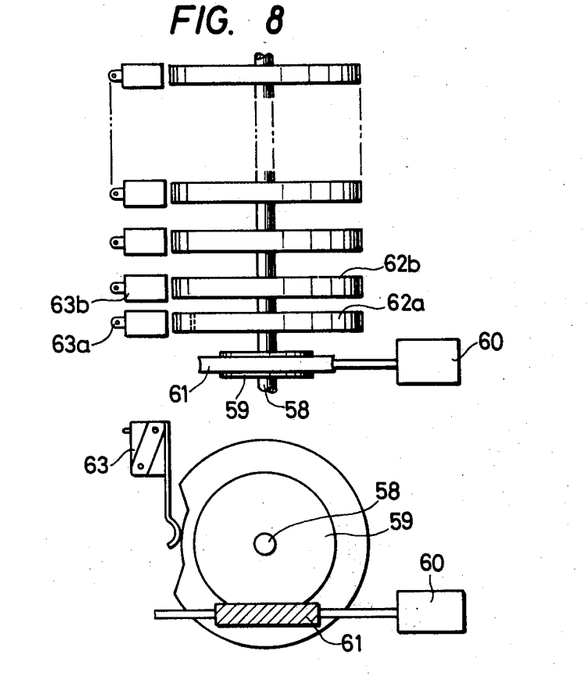
FIG. 8 is a plan view of another example of the control system.

The control circuit 53 is comprised of known logic circuit components connected such that it will produce command signals for energizing the motor 13, the plungers 18, 36, 42, 48 and the rotary plunger 38 sequentially with predetermined timing in response to a signal fed from the terminal 54 or the switch 56. The control circuit 53 may be of an integrated circuit design. Output signals which are equivalent to those from the logic control circuit 53 can be generated by a mechanical arrangement. For example, in FIG. 8, a main gear 59 rotatable with a shaft 58 can be driven by a worm gear 61 meshed with the main gear 59 and coupled to a motor 60. The motor 60 starts to rotate in response to a signal supplied from the terminal 54 or the switch 56. The shaft 58 supports thereon a first cam 62a and a first switch 63a associated therewith for controlling the motor 13 (FIG. 1), a second cam 62b and a second switch 63b associated therewith for controlling the plunger 18 (FIG. 1), and other cams and associated switches for controlling other motors and plungers, if necessary. These cams may be arranged to energize the switches at predetermined intervals.

Figure 9:
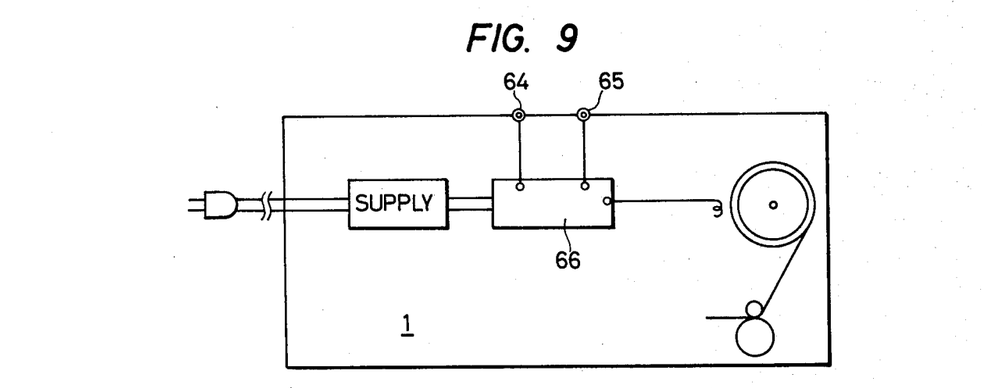
FIG. 9 is a block diagram of a control system for a cassette deck.

As illustrated in FIG. 9, the cassette deck 1 has terminals 64, 65 to be connected respectively to the terminals 54, 57 on the cassette reversing device 5. The terminal 64 serves to supply a predetermined signal generated by a control circuit 66 upon completion of a recording or reproducing operation, to the control circuit 53 (FIG. 7) in the cassette reversing device 5. The terminal 65 serves to supply a signal produced by the control circuit 53 in the cassette reversing device 5 after operation thereof have been carried out, to the control circuit 66 in the cassette deck 1 to start the latter in the recording or reproducing mode of operation.

In addition to the various features described hereinbefore, the door 7 is provided to prevent dust from entering the mechanism of the device 5 during the latter is not activated. As shown in FIG. 3, the door 7 is vertically rotatably mounted by a pin 67 on the housing 8 and is biased by a spring in a closing direction such that the door 7 lies flush with the panel 6 to close an opening formed in the front panel. The door 7 is opened and closed in response to movements of the subchassis 9. More specifically, when the subchassis 9 starts to move forwardly, a cover 69 (shown in FIG. 4) which covers a front end of the mechanism pushes the door 7 open. The door 7 is eventually brought into an open position, as illustrated in FIG. 4, when a pusher arm 70 attached to the subchassis 9 abuts at its front end against a pin 7a on the door 7. The cover 69 is constructed such that it covers the mechanism projecting out of the housing 8 when the subchassis 9 is in the second position. A pusher arm 70 having slots 70a, 70b receiving therein pins 71a, 71b, secured to the subchassis 9, respectively, is provided to hold the door 7 opened while absorbing any errors in the lateral stroke of the subchassis 9 by a spring 72 biasing the arm 70 to the left side of the subchassis. That is, the pusher arm 70 abuts against the pin 7a on the door 7 after being opened substantially horizontally by the cover 69 and holds the door 7 as it is when the driver 14 completes its functions and is then retracted retracted.

The driver 14 and the swing arm 40 have one-directional pneumatic dampers 73, 74, respectively, for producing smooth and damped movements of the driver 14 and the swing arm 40. As illustrated in FIG. 4, the pneumatic damper 73 comprises a damper cylinder 75 mounted on the subchassis 9 and a piston 76 coupled to an extension of the driver 14. With the damper 73, the driver 14 is allowed to rotate smoothly clockwisely to the third position when the plunger 18 is energized and to return to the second position by the biasing force of the spring 16 when the plunger 18 is de-energized. Similarly, the pneumatic damper 74 comprises a damper cylinder 77 and a piston 78 coupled to a rear end of the swing arm 40, the damper 74 being capable of producing a pneumatic damping only when the piston 78 moves in one direction. Thus, when the plunger 42 is actuated, the pneumatic damper 74 is put into operation to allow the swing arm 40 to rotate smoothly clockwise, pushing the cassette holder 3. With the plunger 42 de-energized, the swing arm 40 is rotated counterclockwisely slowly to the starting position by the biasing force of the spring 41.

Figure 10:
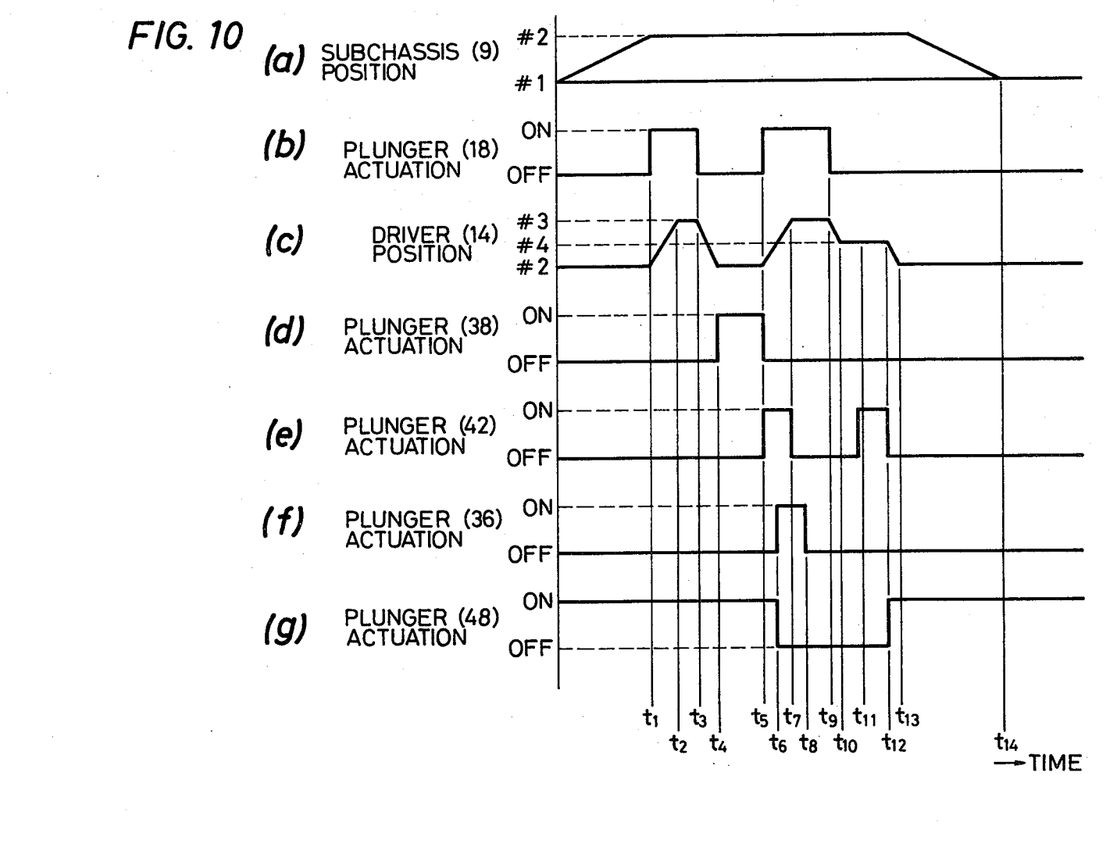
FIG. 10 is a timing chart explanatory of operations of the device shown in FIG. 8.

Operation of the device 5 thus constructed will be described with reference to a timing chart shown in FIG. 10. When a recording or reproducing mode of operation of the cassette deck 1 is completed a known tape end detector (not shown) provides a control signal. The control circuit 66 (FIG. 9) starts to operate in response thereto. The control circuit 66 actuates the plunger 29 (FIG. 4) to open the holder 3 to bring cassette 4 to the eject position, in the conventional manner, and, at the same time, produces a command signal for commanding a reversing operation of the cassette 4. The command signal is delivered to the control circuit 53 (FIG. 7) in the cassette reversing device 6 through the terminals 64 and 54. The control circuit 53 is responsive to such a command signal to drive the motor 13 to rotate in a forward direction for moving the subchassis 9 from the first position illustrated in FIG. 3 to the second position shown in FIG. 4. FIG. 10 shows at (a) positional changes of the subchassis 9 with time. When the subchassis 9 arrives at the second position at $t_1$, the engagement portion 9a thereof actuates the limit switch 20 which produces an output signal upon which the motor 13 is stopped to operate. At this time, the plunger 18 is energized as shown at (b) in FIG. 10. The driver 14 is now caused to rotate clockwisely from the second position shown in FIG. 4 and reaches at the third position at $t_2$, as shown in FIG. 5. FIG. 10 illustrates at (c) positional changes assumed by the driver 14.

On such angular movement of the driver 14, the first and second grip arms 32, 34 grip at their far ends the cassette 4 in the holder 3 in the eject position under the force of the spring 46. The cassette 4 is reliably gripped between the grip arms since it is guided by the slanted surfaces at the far ends of the grip arms 32, 34. As mentioned before, the second position and the third position of the driver 14 and hence the gripper 31 can be adjusted by the adjustment screws 25 and 30, respectively, so that an optimum gripping conditions is achieved.

After the cassette 4 has been gripped by the gripper 31, the control circuit 53 generates a control signal at $t_3$ to de-energize the plunger 18 (FIG. 10(b)), whereupon the driver 14 is caused to return to the second position under the resiliency of the spring 16. With the driver 14 returned to the second position at $t_4$ (FIG. 10(c)), the rotary plunger 38 is energized for a certain period of time ($t_5-t_4$) as shown at (d) in FIG. 10 to enable the gripper 31 to turn around the cassette 4 by 180°. The engagement portion 34a of the second grip arm 34 of the gripper 31 is now brought into engagement with the movable member 36a of the plunger 36. The engagement portion 34a and the movable member 36a are shown interengaged in FIGS. 3 through 5.

After the cassette 4 is reversed at $t_5$, the plunger 18 is energized once again to cause the driver 14 to start moving toward the third position. At the same time, the plunger 42 is also energized as shown at (e) in FIG. 10 to turn the swing arm 40 to enable the roller 43 to push the the cassette 4 into a suitable place shown in FIG. 4, until the free end 4a of the cassette 4 is positioned inside of the far end 3a of the cassette holder 3. The cassette 4 can now be inserted into the cassette holder 3 as the driver 14 continues to rotate clockwisely. When the cassette 4 is fully inserted in the cassette holder 3, the plunger 36 is energized at $t_6$ as shown at (f) in FIG. 10 to actuate the second grip arm 34 against the spring 35 until the cassette 4 is released at $t_7$ from the gripper 31. At $t_6$, the plunger 48 which has been energized becomes de-energized and slightly after the energization of the plunger 36, the plunger 42 is de-energized at $t_8$ as shown at (g) in FIG. 10, to allow the engagement arm 46 to rotate under the force of the spring 47 into a position in which the hook 46a is engageable with the pin 45 on the driver 14.

The plunger 18 is de-energized a suitable interval of time after the cassette 4 has been completely installed in the cassette holder 3 at $t_g$. On the returning movement of the driver 14 to the second position under the biasing force of the spring 16, the pin 45 is engaged by the hook 46a of the engagement arm 46, causing the driver 14 to be held in the fourth position (FIG. 10 (c)) between the third and second positions. In the fourth position, the plunger 42 is energized again at $t_{11}$ for a certain period of time as shown at (e) in FIG. 10, whereupon the swing arm 40 pushes with the roller 43 thereof the cassette holder 3 toward the deck 1 so that the cassette 4 therein can be put in the recording or reproducing operation. Thereafter, at $t_{12}$, the plunger 48 is actuated again to drive the engagement arm 46 in a direction to allow the drive 14 to return from the fourth to the second position under the resiliency of the spring 16.

When the driver 14 is completely returned to the second position, the control circuit 53 now drives the motor 13 in a reverse direction to move the subchassis 9 from the second position shown in FIG. 4 back to the first position shown in FIG. 3. The engagement portion 9a of the subchassis 9, when it reaches the first position, turns on the switch 19 which produces an output signal to de-energize the motor 13. Upon the completion of the series of cassette reversing operations, the control circuit 66 in the cassette deck 1 is supplied at the terminal 65 with a control signal through the terminal 57 of the control circuit 53 to put the cassette deck 1 into a recording or reproducing mode of operation.

While in the illustrated embodiment a cassette tape and a cassette deck have been shown as a recording medium and a recording and reproducing apparatus, respectively, the present invention can be applied to a combination of a small-diameter digital audio disc and a digital audio disc player. The timing at which the motor and the various plungers are energized may be modified appropriately, and the mechanism of the device may be subjected to a variety of modifications.

According to the present reversing device for use with a recording and reproducing apparatus of the so-called "slot-in" type, the gripper automatically grips the recording medium after the latter has been ejected by the holder upon completion of recording or reproducing along a first direction of or on a first face of the recording medium, and the reverser turns the gripper which reinserts the reversed recording medium back into the holder. Thus, the reversing device automatically effects the series of the operations without complex manual procedures making the recording and reproducing apparatus amenable to use by disabled or visually handicapped users. The portion of the reversing device which grips and reverses the recording medium is disposed separately from the mechanism for the recording and reproducing apparatus, and projects out of the housing of the device only when it is required to operate. Therefore, the operating condition of the recording medium or a label attached thereto can be monitored or identified from the exterior while the apparatus is operating. The reversing device does not hamper manual operation of taking the recording medium into or out of its holder on the recording and reproducing apparatus.

Furthermore, according to the present invention, it is possible to reliably return the recording medium which has been reversed back to the holder by regulating the position of the free end portion of the medium by means of the actuator when the return is required.

Since the door of the reversing device is opened and closed according to the movement of the subchassis which is aligned with the door and shiftable between the two positions, there is no need to open and close the door manually. Further, since the door is opened only when the mechanism operates, dust contamination of the interior of the housing of the device is minimized. Since the door is aligned through the connecting arm biased in the predetermined direction with the subchassis, it is possible to absorb errors in the moving stroke of the subchassis by moving the connecting arm.

Furthermore, the second position of the subchassis, in which the gripper should face to the recording medium in the eject position can be regulated and the third position of the driver in which the gripper grips the recording medium is also regulatable, the gripping operation of the gripper becomes more reliable. It is another advantage that the regulations of the second and third positions of the driver can be performed arbitrarily externally through the holes formed in the housing.

Since the damper is connected to the driver, there is no problems in noise generation, shock damage and/or binding of various members, which are otherwise inherent to the movement of the driver. Although it may be possible to utilize inertia of a flywheel or air resistance of a fan as the damper, the air damper may be preferable in structural simplicity, compactness and reliability.

Furthermore, with the employment of the cover which covers at least the portion of the reversing device which protrudes from the housing thereof when the subchassis is in its second position, mechanical protection is given to that portion.

In addition to these advantages, it is another feature of the present invention that the reversing operation can be performed automatically by the use of the end detection signal to be given from the deck or manually by the use of the manual reversing instruction switch.

What is claimed is:

1. A device for reversing a recording medium for use with a recording or reproducing apparatus which has a mechanism to automatically eject the recording medium from behind a plane to the forward side thereof after one side of the medium has been used, comprising gripper means adapted to grip, at a gripping position thereof, the recording medium in an eject position of the recording or reproducing apparatus, driver means for driving said gripper means between said gripping position and a reversing position, said gripping means being mounted on said driver means, reversing means mounted on said driver means and operatively connected to said gripper means for angularly moving said gripper means substantially through 180 degrees to turn around the recording medium at said reversing position of said gripper means and release means adapted to release the gripping operation of said gripper means after the recording medium has been reversed, said gripper, driver, reversing and release means being movable to a first position behind said plane and to a second position corresponding to a position in which said recording medium is ejected.

2. A device according to claim 1, wherein said driver means includes a member supporting thereon said gripper means, said reversing means, and said releasing means, said member being movable in a vertical plane with respect to a housing of the device.

3. A device according to claim 2, wherein said member is movable between a first position in which said gripper means, said reversing means, and said releasing means are accommodated in said housing and a second position in which said gripper means, said reversing means, and said releasing means project out of said housing, said second position corresponding to a position in which said recording medium is ejected.

4. A device according to claim 1, wherein said gripper means comprises first and second grip arms angularly movably coupled with each other, and means urging said first and second grip arms to move distal ends thereof toward each other for gripping the recording medium between said distal ends.

5. A device according to claim 1, further comprising an actuator means for bringing said recording medium released from said gripper means by said release means to the recording or reproducing position.

6. A device according to claim 5, wherein said driver means includes a member rotatable with respect to a housing of the device, and said gripper means, said release means, said reversing means and said actuator means are mounted on said member.

7. A device according to claim 6, wherein said member is shiftable between a first position in which said gripper means, said reversing means, said release means and said actuator means are accommodated in said housing and a second position in which said gripper means, said reversing means, said release means and said actuator means project out of said housing, said second position corresponding to a position in which said recording medium is ejected.

8. A device according to claim 5, wherein said actuator means includes a rotary arm rotatable with respect to said member, an biasing means for biasing said rotary arm in a predetermined direction and means for driving said rotary arm against said biasing means so that said recording medium is pushed by an end of said rotary arm.

9. A device according to claim 1, further comprising a position regulating means for regulating position of a free end of said recording medium when the latter is returned by said gripper means to said eject position after reversed by said reversing means.

10. A device according to claim 9, wherein said driver means includes a member which supports thereon said gripper means, said reversing means and said release means and is angularly movable with respect to a housing of the device.

11. A device according to claim 10, wherein said member is movable between a first position in which said gripper means, said reversing means, and said releasing means are accommodated in said housing and a second position in which said gripper means, said reversing means, and said releasing means project out of said housing, said second position corresponding to a position in which said recording medium is ejected.

12. A device according to claim 9, wherein said position regulating means comprises a rotary arm rotatable with respect to said member, a biasing means for biasing said rotary arm in a predetermined direction and means for driving said rotary arm against said biasing means so that said recording medium is pushed by an end of said rotary arm.

13. A device according to claim 1, further comprising a subchassis movable between a first position in which said gripper means, said reversing means, and said releasing means are accommodated in a housing of the device and a second position in which said gripper means, said reversing means, and said releasing means project out of said housing and a door member ganged with said subchassis so that it is closed and opened when said subchassis is in said first and second position, respectively, said driver means being supported by said subchassis.

14. A device according to claim 13, wherein said door is connected through a connecting arm biased towards said second position to said subchassis.

15. A device according to claim 1, further comprising a subchassis movable between a first position in which said gripper means, said reversing means, and said releasing means are accommodated in a housing of the device and a second position in which said gripper means, said reversing means, and said releasing means project out of said housing, and a position regulating means for regulating said second position of said subchassis.

16. A device according to claim 1, further comprising a rotary arm rotatable with respect to a housing of the device so that said recording medium released to said eject position upon actuation of said releasing means is brought to a recording or reproducing position and a damper mechanism connected to said rotary arm.

17. A device according to claim 1, further comprising subchassis shiftable between a first position in which said gripper means, said reversing means and said releasing means are accommodated in a housing of the device and a second position in which said gripper means, said reversing means and said releasing means project out of said housing and a cover member for covering at least a portion of the device which is protruded out from the latter when said subchassis is in said second position.

18. A device according to claim 1, further comprising a control circuit for controlling operations of said gripper means, said driver means, said reversing means and said releasing means and a switch means for arbitrarily instructing a reversing movement of said recording medium, said control circuit being commenced to operate in response to a signal provided by either said recording and reproducing device upon completion of recording or reproducing operation thereof or an output signal from said switch means.

19. A device for reversing a recording medium for use with a recording and reproducing apparatus which has a mechanism to automatically eject the recording medium from behind a plane to the forward side thereof after recording or reproducing operation has been effected thereon, said device comprising a gripper means shiftable between a gripping position in which it is able to grip said recording medium in its eject position and a reversing position, a reversing means for angularly moving said gripper means substantially through 180 degrees to turn around the recording medium in said reversing position, a release means for releasing said gripper means as returned to said gripping position after the recording medium has been reversed by said reversing means, a driver member supporting thereon at least said gripper means and rotatable with respect to a housing of the device so as to bring said gripper means in said gripping position or said reversing position, suitably, and a position regulating means for regulating an angular position of said driver member corresponding to said gripping position, said gripper, reversing, release and position regulating means and said driver member being movable to a first position behind said plane and to a second position corresponding to a position in which said recording medium is ejected.

20. A device for reversing a recording medium for use with a recording and reproducing apparatus which has a mechanism to automatically eject the recording medium from behind a plane to the forward side thereof after recording or reproducing operation has been effected thereon, said device comprising, a gripper means shiftable between a gripping position in which it is able to grip said recording medium in its eject position and a reversing position, a reversing means for angularly moving said gripper means substantially through 180 degrees to turn around the recording medium in said reversing position, a release means for releasing said gripper means as returned to said gripping position after the recording medium has been reversed by said reversing means, a driver member supporting thereon at least said gripper means and rotatable with respect to a housing of the device, one wall of which substantially coincides with said plane, so as to bring said gripper means in said gripping position or said reversing position, suitably a subchassis having thereon said reversing means, said releasing means and said driver member, said subchassis being shiftable between a first position in which said reversing means, said releasing means and said driving member are accommodated in said housing and a second position corresponding to said recording medium in the eject position in which said reversing means, said releasing means and said driving member project out of said housing; and a position regulating means for regulating an angular position of said driving member corresponding to said gripping position and said second position of said subchassis so that it is possible to perform the position regulations by said regulator means externally through a hole formed in said housing.

21. A device for reversing a recording medium for use with a recording and reproducing apparatus which has a mechanism to automatically eject the recording medium from behind a plane to the forward side thereof after recording or reproducing operation has been effected thereon, said device comprising, a gripper means shiftable between a gripping position in which it is able to grip said recording medium in its eject position and a reversing position, a reversing means for angularly moving said gripper means substantially through 180 degrees to turn around the recording medium in said reversing position, a release means for releasing said gripper means as returned to said gripping position after the recording medium has been reversed by said reversing means; a driver member supporting thereon at least said gripper means and rotatable with respect to a housing of the device so as to bring said gripper means in said gripping position or said reversing position, suitably, and a damper mechanism connected to said driver member; said gripper, reversing, and release means and said driver member being movable to a first position behind said plane and to a second position corresponding to a position in which said recording medium is ejected.

* * * * *